(12) United States Patent
McMullen et al.

(10) Patent No.: US 10,309,200 B2
(45) Date of Patent: Jun. 4, 2019

(54) SEALLESS DOWNHOLE SYSTEM WITH MAGNETICALLY SUPPORTED ROTOR

(71) Applicant: Upwing Energy, LLC, Cerritos, CA (US)

(72) Inventors: Patrick McMullen, Villa Park, CA (US); Herman Artinian, Huntington Beach, CA (US); Kuo-Chiang Chen, Kennedale, TX (US); David Biddick, Houston, TX (US)

(73) Assignee: Upwing Energy, LLC, Cerritos, CA (US)

( * ) Notice: Subject to any disclaimer, the term of this patent is extended or adjusted under 35 U.S.C. 154(b) by 0 days.

(21) Appl. No.: 16/107,824

(22) Filed: Aug. 21, 2018

(65) Prior Publication Data

US 2019/0085672 A1    Mar. 21, 2019

Related U.S. Application Data

(60) Provisional application No. 62/561,067, filed on Sep. 20, 2017.

(51) Int. Cl.
*E21B 4/02* (2006.01)
*E21B 4/04* (2006.01)
(Continued)

(52) U.S. Cl.
CPC ............ *E21B 43/128* (2013.01); *E21B 4/003* (2013.01); *E21B 4/02* (2013.01); *E21B 4/04* (2013.01);
(Continued)

(58) Field of Classification Search
CPC ... E21B 4/003; E21B 4/02; E21B 4/04; E21B 43/128; F04D 13/0633; F04D 13/0646
See application file for complete search history.

(56) References Cited

U.S. PATENT DOCUMENTS 3,705,603 A * 12/1972 Hawk .................... E21B 47/18
                                                        137/624.14
5,068,554 A * 11/1991 Mohn ....................... E21B 4/04
                                                              310/112
(Continued)

FOREIGN PATENT DOCUMENTS

| EP | 2295811 | 3/2011 |
|----|---------|--------|
| EP | 2715141 | 4/2014 |
| WO | WO2016/089399 | 6/2016 |

OTHER PUBLICATIONS

International Search Report and Written Opinion International issued in Application No. PCT/US2018/051637 dated Jan. 18, 2019, 18 pages.

*Primary Examiner* — Cathleen R Hutchins
(74) *Attorney, Agent, or Firm* — Fish & Richardson P.C.

(57) ABSTRACT

A fluid module includes a fluid rotor configured to rotatably drive or be driven by fluid produced from a wellbore. A first shaft is coupled to the fluid rotor. The first shaft is configured to rotate in unison with the fluid rotor. A thrust bearing module includes a thrust bearing rotor. A second shaft is coupled to the thrust bearing rotor. The second shaft is configured to rotate in unison with the thrust bearing rotor. The second shaft is coupled to the first shaft. An electric machine module includes an electric machine rotor. A third shaft is coupled to the electric machine rotor. A third shaft is configured to rotate in unison with the electric machine rotor. The third shaft is coupled to the second shaft. The third shaft is rotodynamically isolated from the first shaft and the second shaft.

27 Claims, 7 Drawing Sheets

(51) Int. Cl.

| | |
|---|---|
| *E21B 43/12* | (2006.01) |
| *E21B 17/02* | (2006.01) |
| *E21B 41/00* | (2006.01) |
| *F04D 13/08* | (2006.01) |
| *H02K 5/132* | (2006.01) |
| *F04D 13/06* | (2006.01) |
| *F04D 13/10* | (2006.01) |
| *E21B 47/01* | (2012.01) |
| *E21B 47/06* | (2012.01) |
| *E21B 47/09* | (2012.01) |
| *E21B 47/12* | (2012.01) |
| *F04D 29/041* | (2006.01) |
| *F04D 29/048* | (2006.01) |
| *F16C 32/04* | (2006.01) |
| *F16C 37/00* | (2006.01) |
| *E21B 47/00* | (2012.01) |
| *F04B 17/03* | (2006.01) |
| *F04B 47/04* | (2006.01) |
| *H02K 1/27* | (2006.01) |
| *H02K 7/09* | (2006.01) |
| *H02K 7/18* | (2006.01) |
| *H02K 11/21* | (2016.01) |
| *H02K 11/27* | (2016.01) |
| *H02K 11/30* | (2016.01) |
| *F04D 29/051* | (2006.01) |
| *H02H 7/00* | (2006.01) |
| *H02K 7/14* | (2006.01) |
| *H02P 29/40* | (2016.01) |
| *H02K 3/42* | (2006.01) |
| *H02K 21/14* | (2006.01) |
| *E21B 4/00* | (2006.01) |
| *F04D 13/02* | (2006.01) |
| *F16F 15/03* | (2006.01) |
| *H02K 15/03* | (2006.01) |
| *E21B 33/12* | (2006.01) |
| *H02K 5/128* | (2006.01) |
| *E21B 43/16* | (2006.01) |

(52) U.S. Cl.
CPC ........ *E21B 17/028* (2013.01); *E21B 41/0085* (2013.01); *E21B 43/121* (2013.01); *E21B 47/0007* (2013.01); *E21B 47/01* (2013.01); *E21B 47/06* (2013.01); *E21B 47/09* (2013.01); *E21B 47/12* (2013.01); *F04B 17/03* (2013.01); *F04B 47/04* (2013.01); *F04D 13/026* (2013.01); *F04D 13/064* (2013.01); *F04D 13/0633* (2013.01); *F04D 13/08* (2013.01); *F04D 13/086* (2013.01); *F04D 13/10* (2013.01); *F04D 29/041* (2013.01); *F04D 29/048* (2013.01); *F04D 29/051* (2013.01); *F16C 32/0474* (2013.01); *F16C 32/0476* (2013.01); *F16C 37/005* (2013.01); *H02H 7/005* (2013.01); *H02K 1/2793* (2013.01); *H02K 3/42* (2013.01); *H02K 5/132* (2013.01); *H02K 7/09* (2013.01); *H02K 7/14* (2013.01); *H02K 7/1807* (2013.01); *H02K 11/21* (2016.01); *H02K 11/27* (2016.01); *H02K 11/30* (2016.01); *H02K 21/14* (2013.01); *H02P 29/40* (2016.02); *E21B 33/12* (2013.01); *E21B 43/168* (2013.01); *E21B 47/065* (2013.01); *F16C 32/044* (2013.01); *F16C 2380/26* (2013.01); *F16F 15/03* (2013.01); *H02K 5/128* (2013.01); *H02K 15/03* (2013.01); *H02K 2205/03* (2013.01)

(56) References Cited

U.S. PATENT DOCUMENTS

| | | | |
|---|---|---|---|
| 7,144,226 B2 | 12/2006 | Pugnet et al. | |
| 7,156,627 B2 | 1/2007 | Lenderink et al. | |
| 2004/0179961 A1* | 9/2004 | Pugnet | F04D 17/125 417/423.5 |
| 2006/0073041 A1 | 4/2006 | Goshi | |
| 2008/0078560 A1 | 4/2008 | Hall | |
| 2015/0114632 A1 | 4/2015 | Romer et al. | |
| 2015/0361766 A1* | 12/2015 | Downie | E21B 41/0085 175/41 |
| 2018/0179872 A1 | 6/2018 | Filatov et al. | |

* cited by examiner

SEALLESS DOWNHOLE SYSTEM WITH MAGNETICALLY SUPPORTED ROTOR

CROSS-REFERENCE TO RELATED APPLICATIONS

This application claims the benefit of priority to U.S. Provisional Application Ser. No. 62/561,067, filed on Sep. 20, 2017, the contents of which are hereby incorporated by reference.

BACKGROUND

Most wells behave characteristically different over time due to geophysical, physical, and chemical changes in the subterranean reservoir that feeds the well. For example, it is common for well production to decline. This decline in production can be due to declining pressures in the reservoir, and can eventually reach a point where there is not enough pressure in the reservoir to economically realize production through the well to the surface. In some wells, a top side compressor or pump is sometimes used to extend the life of the well by decreasing pressure at the top of the well.

SUMMARY

This disclosure describes boosting well production.

An example implementation of the subject matter described within this disclosure is a downhole-type artificial lift system with the following features. A fluid module includes a fluid rotor configured to rotatably drive or be driven by fluid produced from a wellbore. A first shaft is coupled to the fluid rotor. The first shaft is configured to rotate in unison with the fluid rotor. A fluid stator surrounds the fluid rotor. A thrust bearing module includes a thrust bearing rotor. A second shaft is coupled to the thrust bearing rotor. The second shaft is configured to rotate in unison with the thrust bearing rotor. The second shaft is coupled to the first shaft. The second shaft is configured to transfer torque between the first shaft and the second shaft. The second shaft is rotodynamically isolated from the first shaft. A thrust bearing stator surrounds the thrust bearing rotor. An electric machine module includes an electric machine rotor. A third shaft is coupled to the electric machine rotor. The third shaft is configured to rotate in unison with the electric machine rotor. The third shaft is coupled to the second shaft or the first shaft. The third shaft is configured to transfer torque between the second shaft and the third shaft or the first shaft. The third shaft is rotodynamically isolated from the first shaft and the second shaft. An electric stator surrounds the electric machine rotor.

Aspects of the example implementation, which can be combined with the example implementation alone or in combination, include the following. The system is configured to rotate the first shaft below a critical speed of the first shaft, rotate the second shaft below a critical speed of the second shaft, and rotate the third shaft below a critical speed of the third shaft.

Aspects of the example implementation, which can be combined with the example implementation alone or in combination, include the following. The critical speed of the first shaft, the critical speed of the second shaft, and the critical speed of the third shaft are greater than a critical speed of a single shaft of equivalent length to a sum of a length of the first shaft, a length of the second shaft, and a length of the third shaft.

Aspects of the example implementation, which can be combined with the example implementation alone or in combination, include the following. The system is configured to rotate the first shaft, the second shaft, and the third shaft at 10,000 revolutions per minute (rpm).

Aspects of the example implementation, which can be combined with the example implementation alone or in combination, include the following. The system is configured to rotate the first shaft, the second shaft, and the third shaft at 120,000 rpm.

Aspects of the example implementation, which can be combined with the example implementation alone or in combination, include the following. The fluid module is positioned at an uphole end of the system and the electric machine module is positioned at a downhole end of the system.

Aspects of the example implementation, which can be combined with the example implementation alone or in combination, include the following. The fluid module further includes a first magnetic radial bearing configured to support a first end of the first shaft to the fluid stator and a second radial magnetic bearing configured to support a second end of the first shaft to the fluid stator.

Aspects of the example implementation, which can be combined with the example implementation alone or in combination, include the following. The electric machine module further includes a first magnetic radial bearing configured to support a first end of the second shaft to the electric stator and a second radial magnetic bearing configured to support a second end of the second shaft to the electric stator.

Aspects of the example implementation, which can be combined with the example implementation alone or in combination, include the following. The thrust bearing module includes a magnetic thrust bearing.

Aspects of the example implementation, which can be combined with the example implementation alone or in combination, include the following. The magnetic thrust bearing is an active magnetic thrust bearing.

Aspects of the example implementation, which can be combined with the example implementation alone or in combination, include the following. The thrust bearing module further includes a first magnetic radial bearing configured to support a first end of the second shaft to the thrust bearing stator and a second radial magnetic bearing configured to support a second end of the second shaft to the thrust bearing stator.

Aspects of the example implementation, which can be combined with the example implementation alone or in combination, include the following. The fluid module is a first fluid module, the fluid rotor is a first fluid rotor, and the fluid stator is a first fluid stator. The downhole-type artificial lift system further includes a second fluid module with a second fluid rotor configured to rotatably drive or be driven by fluid produced from a wellbore. A fourth shaft is coupled to the second fluid rotor. The fourth shaft is configured to rotate in unison with the second fluid rotor. The fourth shaft is rotodynamically isolated from the first shaft, the second shaft, and the third shaft. A second fluid stator surrounds the second fluid rotor.

Aspects of the example implementation, which can be combined with the example implementation alone or in combination, include the following. The thrust bearing module is a first thrust bearing module, the thrust bearing rotor is a first thrust bearing rotor, and the thrust bearing stator is a first thrust bearing stator. The downhole-type artificial lift system further includes a second thrust bearing module with a second thrust bearing rotor. A fourth shaft is coupled to the thrust bearing rotor. The fourth shaft is configured to rotate in unison with the second thrust bearing rotor. The fourth shaft is rotodynamically isolated from the first shaft, the second shaft, and the third shaft. A second thrust bearing stator surrounds the second thrust bearing rotor.

Aspects of the example implementation, which can be combined with the example implementation alone or in combination, include the following. The electric machine module is a first electric machine module, the electric machine rotor is a first electric machine rotor, and the electric stator is a first electric stator. The downhole-type artificial lift system further includes a second electric machine module with a second electric machine rotor. A fourth shaft is coupled to the second electric machine rotor. The fourth shaft is configured to rotate in unison with the second electric machine rotor. The fourth shaft is rotodynamically isolated from the first shaft, the second shaft, and the third shaft. A second electric stator surrounds the second electric machine rotor.

An example implementation of the subject matter described within this disclosure is a method with the following features. A first rotor is radially magnetically levitated within a first stator. A second rotor is radially magnetically levitated within a second stator. A third rotor is radially magnetically levitated within a third stator. The first rotor is rotodynamically isolated from the second rotor by a first rotodynamic isolator coupling. The second rotor is rotodynamically isolated from the third rotor by a second rotodynamic isolator.

Aspects of the example implementation, which can be combined with the example implementation alone or in combination, include the following. The first rotor, the second rotor, and the third rotor are rotated in unison at 10,000 rpm.

Aspects of the example implementation, which can be combined with the example implementation alone or in combination, include the following. The first rotor, the second rotor, and the third rotor are rotated in unison at 120,000 rpm.

Aspects of the example implementation, which can be combined with the example implementation alone or in combination, include the following. The first rotor, the second rotor, and the third rotor are axially supported with a magnetic thrust bearing.

Aspects of the example implementation, which can be combined with the example implementation alone or in combination, include the following. Radial vibrations are dampened.

Aspects of the example implementation, which can be combined with the example implementation alone or in combination, include the following. Torque is exchanged between the first rotor and second rotor by a first rotodynamic isolator coupling. The first coupling is configured to rotodynamically isolate the first rotor and second rotor from one another. Torque is exchanged between the second rotor and the third rotor by a second rotodynamic isolator coupling. The second coupling is configured to rotodynamically isolate the third rotor and second rotor from one another.

Aspects of the example implementation, which can be combined with the example implementation alone or in combination, include the following. An outer surface of the first rotor and an inner surface of the first stator form an annulus. A wellbore production fluid is flowed through the annulus in an uphole direction.

An example implementation of the subject matter described within this disclosure is a wellbore production system with the following features. A fluid module includes a fluid rotor configured to rotatably drive or be driven by fluid produced from a wellbore. A first shaft is coupled to the fluid rotor. The first shaft is configured to rotate in unison with the fluid rotor. A fluid stator surrounds the fluid rotor. A first magnetic radial bearing is configured to support a first end of the first shaft to the fluid stator. A second radial magnetic bearing is configured to support a second end of the first shaft to the fluid stator. A thrust bearing module includes a thrust bearing rotor. A second shaft is coupled to the thrust bearing rotor. The second shaft is configured to rotate in unison with the thrust bearing rotor. The second shaft is coupled to the first shaft. The second shaft is configured to transfer torque between the first shaft and the second shaft. The second shaft is rotodynamically isolated from the first shaft. A thrust bearing stator surrounds the thrust bearing rotor. An electric machine module includes an electric machine rotor. A third shaft is coupled to the electric machine rotor. The third shaft is configured to rotate in unison with the electric machine rotor. The third shaft is coupled to the second shaft or the first shaft. The third shaft is configured to transfer torque between the second shaft and the third shaft or the first shaft. The third shaft is rotodynamically isolated from the first shaft and the second shaft. An electric stator surrounds the electric machine rotor. A third magnetic radial bearing is configured to support a first end of the second shaft to the electric stator. A fourth radial magnetic bearing is configured to support a second end of the second shaft to the electric stator.

Aspects of the example implementation, which can be combined with the example implementation alone or in combination, include the following. The system is configured to rotate the first shaft below a critical speed of the first shaft, rotate the second shaft below a critical speed of the second shaft, and rotate the third shaft below a critical speed of the third shaft.

Aspects of the example implementation, which can be combined with the example implementation alone or in combination, include the following. The system is configured to rotate the first shaft, the second shaft, and the third shaft at 60,000 revolutions per minute.

Aspects of the example implementation, which can be combined with the example implementation alone or in combination, include the following. The thrust bearing module further includes a first magnetic radial bearing configured to support a first end of the second shaft to the thrust bearing stator and a second radial magnetic bearing configured to support a second end of the second shaft to the thrust bearing stator.

Aspects of the example implementation, which can be combined with the example implementation alone or in combination, include the following. The thrust bearing module includes a magnetic thrust bearing.

Aspects of the example implementation, which can be combined with the example implementation alone or in combination, include the following. The fluid module is a first fluid module, the fluid rotor is a first fluid rotor, and the fluid stator is a first fluid stator. The wellbore production system further includes a second fluid module with a second fluid rotor configured to rotatably drive or be driven by fluid produced from a wellbore. A fourth shaft is coupled to the second fluid rotor. The fourth shaft is configured to rotate in unison with the second fluid rotor. The fourth shaft is rotodynamically isolated from the first shaft, the second shaft, and the third shaft. A second fluid stator surrounds the second fluid rotor.

Aspects of the example implementation, which can be combined with the example implementation alone or in combination, include the following. The thrust bearing module is a first thrust bearing module, the thrust bearing rotor is a first thrust bearing rotor, and the thrust bearing stator is a first thrust bearing stator. The wellbore production system further includes a second thrust bearing module with a second thrust bearing rotor. A fourth shaft is coupled to the thrust bearing rotor. The fourth shaft is configured to rotate in unison with the second thrust bearing rotor. The fourth shaft is rotodynamically isolated from the first shaft, the second shaft, and the third shaft. A second thrust bearing stator surrounds the second thrust bearing rotor.

Aspects of the example implementation, which can be combined with the example implementation alone or in combination, include the following. The electric machine module is a first electric machine module, the electric machine rotor is a first electric machine rotor, and the electric stator is a first electric stator. The wellbore production system further includes a second electric machine module with a second electric machine rotor. A fourth shaft is coupled to the second electric machine rotor. The fourth shaft is configured to rotate in unison with the second electric machine rotor. The fourth shaft is rotodynamically isolated from the first shaft, the second shaft, and the third shaft. A second electric stator surrounds the second electric machine rotor.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

In the downhole environment, it is difficult to install and operate any equipment due to the caustic fluids present, pressures, temperatures, and relative distance from any supporting equipment that cannot be repackaged to fit in a small diameter tube. In addition, any installation and removal of tools in the well requires the well to be "shut-down" or "killed" to prevent fluid flowing to the surface that can cause damage or injury, a very costly process not only in performing the work, but also in lost production and risk in damaging the well where further production is jeopardized.

While all these issues and risks exist, the potential benefit of well intervention with production enhancing tools and measurement equipment is a prevalent industry because of the enhanced production it can offer. While these benefits have been demonstrated, reliability and robustness of equipment in this harsh environment is not close to conventional topside mounted equipment. The subject matter described herein is able to change this by utilizing a magnetic bearing system for rotor support, a magnetic thrust bearing for thrust support, a high-speed permanent magnet motor for torque, a sensorless long distance variable frequency drive, magnetic bearing controls, and advanced fluid compression and pump configuration. The use of the radial magnetic bearing system, thrust magnetic bearing system, and permanent magnet electric machine allow for adequate operating clearances between rotating and nonrotating parts for fluid to pass, eliminating the need for seals, barrier fluid systems, or protection bag/bellow systems. Particulate material in process fluid is free to flow through the clearances. For example, particulates can be approximately 1-4 mm in size. The use of these systems can also provide operational data for the well currently unavailable, or only available with additional sensor systems. For example, the sensorless variable frequency drive can provide data on operating temperature and fluid properties through its operating requirements. Another example is an active thrust bearing that can provide data on operating pressure during operation and liquid/gas content in the well. The device consists of only high temperature components to allow survival in high temperature environments present in deep wells. The device utilizes fully isolated rotor and stator parts to protect any materials and components that would be adversely affected by the process fluids. This provides the isolation necessary for allowing the process fluid to flow into and through the motor and bearings.

Figure 1:
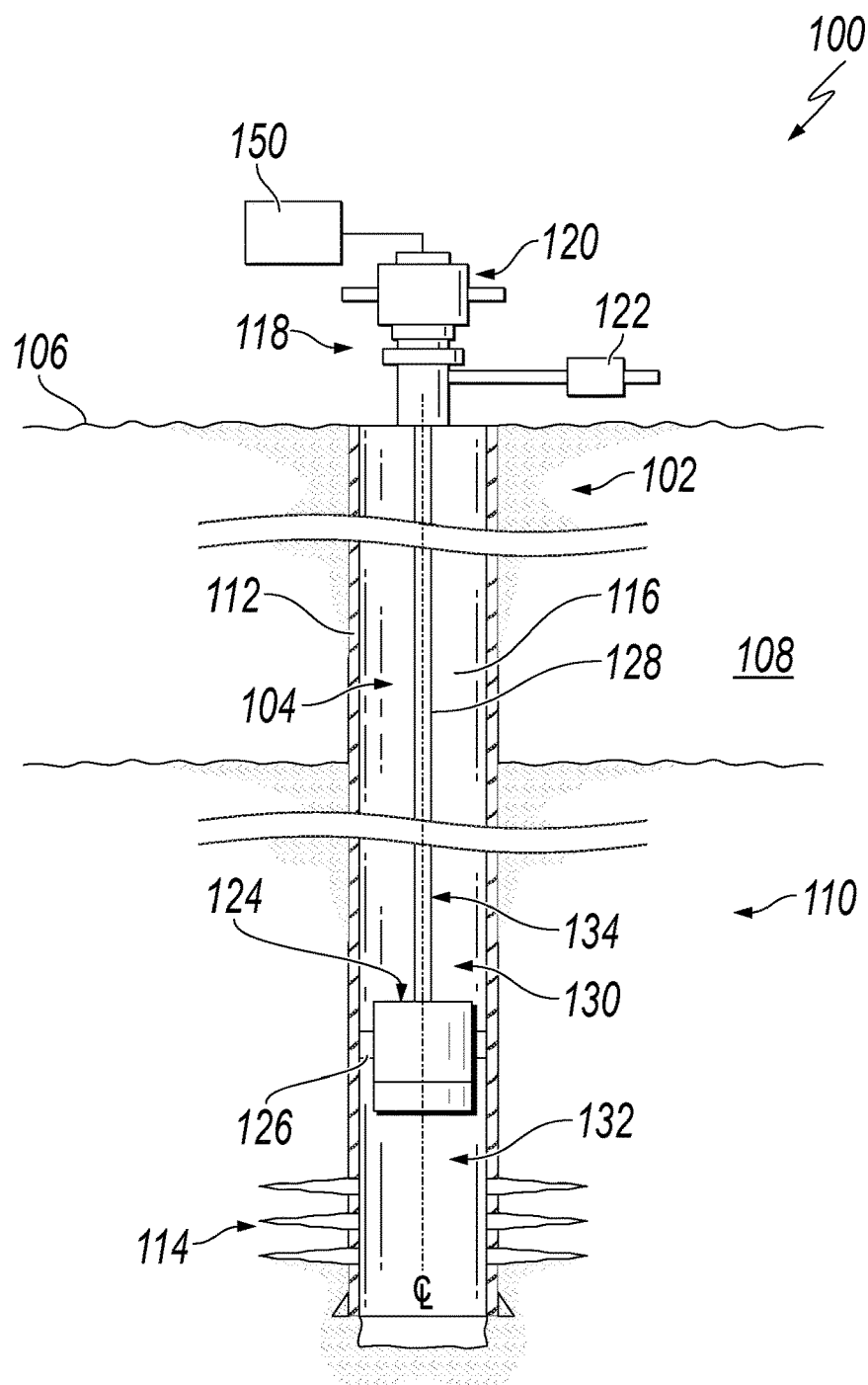
FIG. 1 is a schematic side view of an example well system including a downhole artificial lift system.

FIG. 1 depicts an example well system 100 constructed in accordance with the concepts herein. The well system 100 includes a well 102 having a wellbore 104 that extends from the terranean surface 106 through the earth 108 to one or more subterranean zones of interest 110 (one shown). The well system 100 enables access to the subterranean zones of interest 110 to allow recovery, i.e., production, of fluids to the terranean surface 106 and, in certain instances, additionally or alternatively allows fluids to be placed in the earth 108. In certain instances, the subterranean zone of interest 110 is a formation within the Earth defining a reservoir, but in other instances, the subterranean zone of interest 110 can be multiple formations or a portion of a formation. For simplicity sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a well that is used in producing hydrocarbon production fluid from the subterranean zones of interest 110 to the terranean surface 106. The well may produce only dry gas, liquid hydrocarbons, and/or water. In certain instances, the production from the well 102 can be multiphase in any ratio. The well can produce mostly or entirely liquid at certain times and mostly or entirely gas at other times. For example, in certain types of wells, it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells, or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the terranean surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threaded and/or otherwise) end-to-end. In FIG. 1, the casing 112 is perforated (i.e., having perforations 114) in the subterranean zone of interest 110 to allow fluid communication between the subterranean zone of interest 110 and the inner bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached to the wellhead 118. The Christmas tree 120 includes valves used to regulate flow into or out of the well 102.

FIG. 1 shows a surface compressor 122 residing on the terranean surface 106 and fluidly coupled to the well 102 through the Christmas tree 120. The surface compressor 122 can include a variable speed or fixed speed compressor. The well system 100 also includes a downhole-type artificial lift system 124 residing in the wellbore 104, for example, at a depth that is nearer to subterranean zone of interest 110 than the terranean surface 106. The surface compressor 122 operates to draw down the pressure inside the well 102 at the terranean surface 106 to facilitate production of fluids to the terranean surface 106 and out of the well 102. The downhole-type artificial lift system 124, being of a type configured in size and robust construction for installation within a well 102, assists by creating an additional pressure differential within the well 102. In particular, casing 112 is commercially produced in a number of common sizes specified by the American Petroleum Institute (the "API"), including 4½, 5, 5½, 6, 6⅝, 7, 7⅝, 16/8, 9⅝, 10¾, 11¾, 13⅜, 16, 18⅝ and 20 inches, and the API specifies internal diameters for each casing size. The downhole-type artificial lift system 124 can be configured to fit in, and (as discussed in more detail below) in certain instances, seal to the inner diameter of one of the specified API casing sizes. Of course, the downhole-type artificial lift system 124 can be made to fit in and, in certain instances, seal to other sizes of casing or tubing or otherwise seal to the wall of the wellbore 104.

Additionally, as a downhole-type artificial lift system 124 or any other downhole system configuration such as a pump, compressor, or multi-phase fluid flow aid that can be envisioned, the construction of its components are configured to withstand the impacts, scraping, and other physical challenges the downhole-type artificial lift system 124 will encounter while being passed hundreds of feet/meters or even multiple miles/kilometers into and out of the wellbore 104. For example, the downhole-type artificial lift system 124 can be disposed in the wellbore 104 at a depth of up to 15,000 feet (4,572 meters). Beyond just a rugged exterior, this encompasses having certain portions of any electronics being ruggedized to be shock resistant and remain fluid tight during such physical challenges and during operation. Additionally, the downhole-type artificial lift system 124 is configured to withstand and operate for extended periods of time (e.g., multiple weeks, months, or years) at the pressures and temperatures experienced in the wellbore 104, which temperatures can exceed 400° F./205° C. and pressures over 2,000 pounds per square inch, and while submerged in the well fluids (gas, water, or oil as examples). Finally, as a downhole-type artificial lift system 124, the downhole-type artificial lift system 124 can be configured to interface with one or more of the common deployment systems, such as jointed tubing (i.e., lengths of tubing joined end-to-end, threaded and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (e.g., coupling 220 discussed below, which can be a jointed tubing connector, coiled tubing connector, or wireline connector). In FIG. 1, the downhole-type artificial lift system 124 is shown deployed on wireline 128.

A seal system 126 integrated or provided separately with a downhole system, as shown with the downhole-type artificial lift system 124, divides the well 102 into an uphole zone 130 above the seal system 126 and a downhole zone 132 below the seal system 126. FIG. 1 shows the downhole-type artificial lift system 124 positioned in the open volume of the inner bore 116 of the casing 112, and not within or a part of another string of tubing in the well 102. The wall of the wellbore 104 includes the interior wall of the casing 112 in portions of the wellbore 104 having the casing 112, and includes the open-hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open-hole portions of the wellbore 104. In certain instances, the seal system 126 can form a gas and liquid tight seal at the pressure differential the downhole-type artificial lift system 124 creates in the well 102. In some instances, the seal system 126 of the downhole-type artificial lift system 124 seals against the interior wall of the casing 112 or the open-hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type artificial lift system 124 from a pressure in the wellbore 104 uphole of the seal system 126 of the downhole-type artificial lift system 124. Although FIG. 1 includes both the surface compressor 122 and the downhole-type artificial lift system 124, in other instances, the surface compressor 122 can be omitted and the downhole-type artificial lift system 124 can provide the entire pressure boost in the well 102.

In some implementations, the downhole-type artificial lift system 124 can be implemented to alter characteristics of a wellbore by a mechanical intervention at the source. Alternatively or in addition to any of the other implementations described in this specification, the downhole-type artificial lift system 124 can be implemented as a high flow, low pressure rotary device for gas flow in sub-atmospheric wells. Alternatively or in addition to any of the other implementations described in this specification, the downhole-type artificial lift system 124 can be implemented as a high pressure, low flow rotary device for gas flow in sub-atmospheric wells. Alternatively or in addition to any of the other implementations described in this specification, the downhole-type artificial lift system 124 can be implemented in a direct well-casing deployment for production through the wellbore. While the downhole-type artificial lift system 124 is described in detail as an example implementation of the downhole system, alternative implementations of the downhole system as a pump, compressor, or multiphase combination of these can be utilized in the well bore to effect increased well production.

The downhole system, as shown as the downhole-type artificial lift system 124, locally alters the pressure, temperature, and/or flow rate conditions of the fluid in the wellbore 104 proximate the downhole-type artificial lift system 124 (e.g., at the base of the wellbore 104). In certain instances, the alteration performed by the downhole-type artificial lift system 124 can optimize or help in optimizing fluid flow through the wellbore 104. As described above, the downhole-type artificial lift system 124 creates a pressure differential within the well 102, for example, particularly within the wellbore 104 the downhole-type artificial lift system 124 resides in. In some instances, a pressure at the base of the wellbore 104 is a low pressure (e.g., sub-atmospheric or insufficient to overcome the static head and friction losses of the well), so unassisted fluid flow in the wellbore can be slow or stagnant. In these and other instances, the downhole-type artificial lift system 124 introduced to the wellbore 104 adjacent the perforations 114 can reduce the pressure in the wellbore 104 near the perforations 114 to induce greater fluid flow from the subterranean zone of interest 110, increase a temperature of the fluid entering the downhole-type artificial lift system 124 to reduce condensation from limiting production, and increase a pressure in the wellbore 104 uphole of the downhole-type artificial lift system 124 to increase fluid flow to the terranean surface 106.

The downhole system, as shown as the downhole-type artificial lift system 124, moves the fluid at a first pressure downhole of the fluid module 200 to a second, higher pressure uphole of the downhole-type artificial lift system 124. The downhole-type artificial lift system 124 can operate at and maintain a pressure ratio across the downhole-type artificial lift system 124 between the second, higher uphole pressure and the first, downhole pressure in the wellbore. The pressure ratio of the second pressure to the first pressure can also vary, for example, based on an operating speed of the downhole-type artificial lift system 124, as described in more detail below. In some instances, the pressure ratio across the downhole-type artificial lift system 124 is less than 2:1, where a pressure of the fluid uphole of the downhole-type artificial lift system 124 (i.e., the second, higher pressure) is at or below twice the pressure of the fluid downhole of the downhole-type artificial lift system 124 (i.e., the first pressure). For example, the pressure ratio across the downhole-type artificial lift system 124 can be about 1.125:1, 1.5:1, 1.75:1, 2:1, or another pressure ratio between 1:1 and 2:1. In certain instances, the downhole-type artificial lift system 124 is configured to operate at a pressure ratio of greater than 2:1.

The downhole system, as shown as the downhole-type artificial lift system 124, can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The downhole-type artificial lift system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric, where the pressure in the wellbore 104 is above about 14.7 pounds per square inch absolute (psia), or about 101.3 kiloPascal (kPa). The downhole-type artificial lift system 124 can operate in above atmospheric wellbore pressures, for example, at wellbore pressure between 14.7 psia (101.3 kPa) and 5,000 psia (34,474 kPa).

An amplifier drive and magnetic bearing controller 150 for a downhole system, shown as the downhole-type artificial lift system 124, is in some implementations, located topside to maximize reliability and serviceability. A digital signal processor (DSP) based controller receives the position signals from sensor and/or sensor electronics within the downhole-type artificial lift system 124 and uses this for input as part of its position control algorithm. This algorithm output is a current command to an amplifier to drive coils of the active bearings within the downhole-type artificial lift system 124, thus impacting a force on the rotor (details are explained in greater detail later within the disclosure). This loop typically happens very fast, on the order of 1,000-20,000 times a second depending on the system control requirements. This control system is also capable of interpreting the bearing requirements to estimate forces and fluid pressures in the well. Analog circuit based controller can also perform this function. Having this DSP or analog circuit based controller topside allows for easy communication, service, and improved up time for the system, as any issues can be resolved immediately via local or remote support. Downhole electronics are also an option either proximate to the device or at a location more thermally suitable. In a downhole implementation, the electronics are packaged to isolate them from direct contact with the downhole environment. They offer better control options since they don't suffer with long cable delay and response issues.

Figure 2:
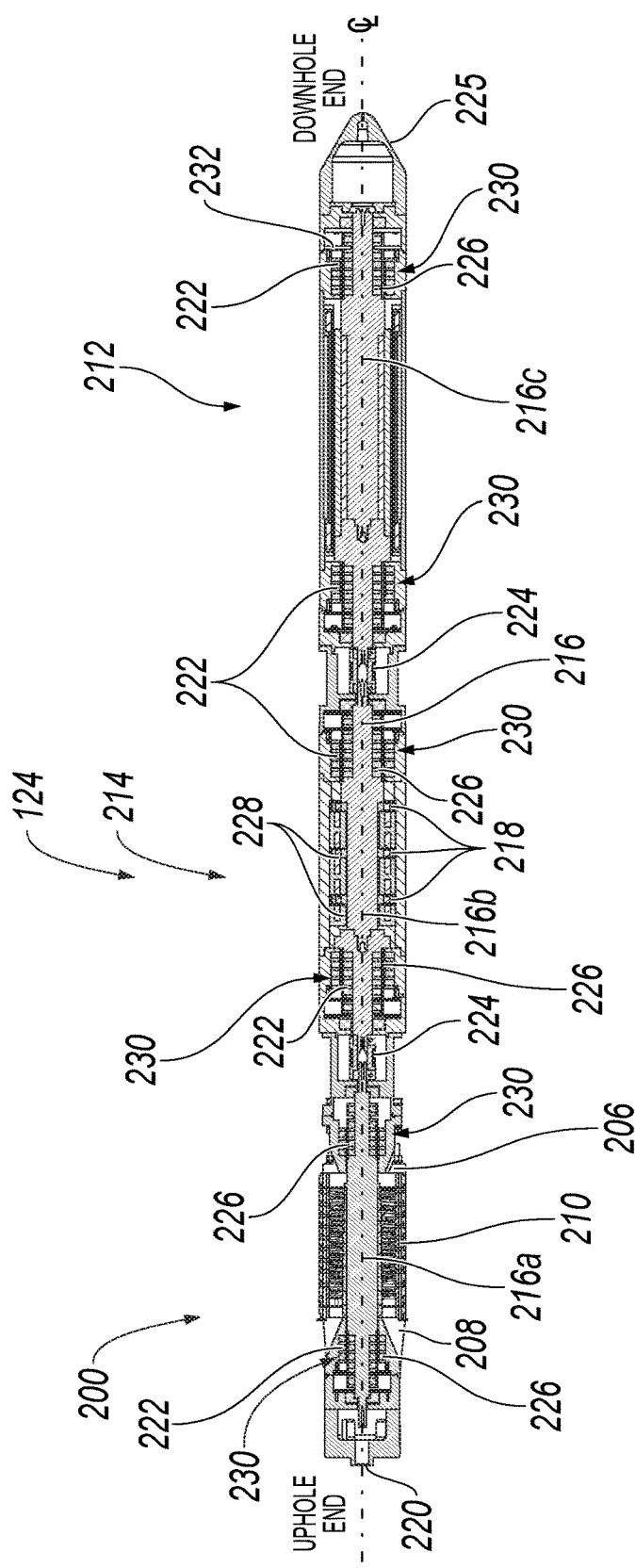
FIG. 2 is a schematic side half cross-sectional view of an example artificial lift system.

The downhole system, shown as the downhole-type artificial lift system 124 is shown schematically in FIG. 1. FIG. 2 is a half side cross-sectional view of the example downhole-type artificial lift system 124. Referring to both FIGS. 1 and 2, the example downhole-type artificial lift system 124 includes a fluid module 200 and an electric machine 204. In the context of this disclosure, an uphole end or direction is an end nearer or moving in a direction towards the terranean surface 106. A downhole end or direction is an end nearer of moving in a direction away from the terranean surface 106. A coupling 220 is positioned at an uphole end of the fluid module 200. The coupling can be of a type used for a wireline connection, a tubing connection, or any other connection configured to support the weight of the downhole-type artificial lift system 124. The coupling 220 can include a standard attachment method to attach the downhole-type artificial lift system 124 to a support system. For example, a threaded interface can be used for sucker rod, or a set of bolts can be used to attach two flanges together for production tubing. The fluid module 200 includes an inlet 206 to receive a fluid at the first pressure downhole of the fluid module 200 and an outlet 208 to output the fluid at the second, higher pressure uphole of the fluid module 200. The inlet 206 can include a filter to limit particle sizes above a certain threshold from entering the downhole-type artificial lift system 124. A cylindrical outer housing 210 houses an impeller (described later) in fluid communication with the inlet 206 to receive the fluid from the wellbore 104 at the first pressure downhole of the fluid module 200 and to drive the fluid to the outlet 208 at the second, higher pressure uphole of the fluid module 200. The inlet 206 includes a series of holes evenly spaced around the circumference of the outer housing 210 and oriented in a downhole trajectory. The outlet 208 includes a series of holes evenly spaced around the circumference of the outer housing 210 and oriented in an uphole trajectory. With the downhole-type artificial lift system 124 residing in the wellbore 104, the inlet 206 is at a downhole end of the fluid module 200 and the outlet 208 is at an uphole end of the fluid module 200. At a downhole end of the downhole-type artificial lift system 124 is a conical tip 225. The conical tip 225 reduces the pressure drop across the downhole-type artificial lift system 124. In some implementations, the conical tip 225 can house electronics that can be used in aspects of operation of the downhole-type artificial lift system 124 or for sensors. In some instances, the downhole-type artificial lift system 124 can be positioned in the well with the downhole inlet 206 positioned adjacent to the perforations 114 in the wellbore 104. For example, the fluid module 200 can be positioned in the wellbore 104 such that the inlet 206 is disposed next to and immediately uphole of the perforations 114 to maximize or improve the fluid flow from the perforations into the fluid module 200. In some examples, the inlet 206 may not be adjacent to perforations 114, such as the inlet 206 being positioned greater than about twenty feet away from the perforations 114. In some instances, a speed of the fluid module 200 is adjusted based on the fluid flow from the subterranean zone into the wellbore 104 (e.g., via perforations 114). For example, as the fluid flow from the subterranean zone into the wellbore 104 decreases, a speed of the fluid module 200 can increase to draw more fluid flow from the subterranean zone into the wellbore 104.

As previously described, the downhole-type artificial lift system 124 moves the fluid from the downhole inlet 206 at the first pressure to the uphole outlet 208 at the second, higher pressure. This pressure differential promotes the fluid flow to move uphole of the downhole-type artificial lift system 124, for example, at a higher flow rate compared to a flow rate in a wellbore without a downhole-type artificial lift system 124. The fluid module 200 can operate at a variety of speeds, for example, where operating at higher speeds increases fluid flow, and operating a lower speeds reduces fluid flow. In some instances, the fluid rotor 216a, the thrust bearing rotor 216b, and/or the electric machine rotor 216c can operate at high-speeds, for example, 10,000-120,000 revolutions per minute (rpm). For the downhole-type artificial lift system 124 illustrated, the maximum operating speed is 60,000 rpm. Specific operating speeds for the downhole system are defined based on the fluid, pressures and flows for the well parameters and desired performance. Speeds may be as low as 10,000 rpm or as high as 120,000 rpm. Special design considerations are made to rotate at such speeds. For example, a high speed machine includes higher strength materials for rotating components than a similarly sized low-speed machine. Balancing requirements are more stringent for a high speed machine as well. In general, a high-speed machine is arranged to reduce the radius of the spinning components. Such a task can be done by elongating the topology of the machine so that there is no need for component overlap. For example, a stator coil can be longitudinally separated from a coupling so that there is no overlap. Such separation allows the stator coils and rotor to have a smaller diameter and tighter clearances as they do not have to surround a large coupling. In some implementations, the downhole-type artificial lift system 124 rotates the central shaft 216, which includes the fluid rotor 216a, the thrust bearing rotor 216b, and the electric machine rotor 216c, to rotate in unison. That is, the central shaft 216 rotates as a direct drive system. Having separate components of the central shaft that are coupled, but rotodynamically isolated (e.g. entirely isolate, substantially isolate, or reduce the transmission of rotodynamic forces) from one-another, allows the downhole-type artificial lift system 124 to rotate at high speeds while maintaining rotodynamic stability. This is because the first critical speed (first harmonic) of the individual components is higher than a single shaft of equivalent length to the smaller components. While the downhole system has an optimal speed range at which it is most efficient, this does not prevent the downhole system from running at less efficient speeds to achieve a desired flow for a particular well, as well as characteristics change over time.

FIG. 2 further illustrates an electric machine 212 and a thrust bearing module 214. The electric machine 212, the thrust bearing module 214, and the fluid module 200 are all coupled together on a central shaft 216. The electric machine 212 is configured to rotatably drive or be driven to generate electricity by the fluid module 200. The central shaft 216 is levitated and axially supported by one or more active magnetic thrust bearing assemblies 218 located in the thrust bearing module 214. One or more passive magnetic radial bearing assemblies 222 radially levitate and support the central shaft 216. While one of each electric machine 212, thrust bearing module 214, and fluid module 200 modules are shown, more than one of each or all are practical in this configuration, thus allowing for additional motor power, additional thrust load support, and additional flow or pressure capacity to be added independently of each other to best produce the specific well performance. In addition, while the order of electric machine 212, thrust bearing module 214, and fluid module 200 module from downhole to uphole is shown, each module functions independently and can be placed in other orders that best suit the operation and integration of each module. Additionally, while a fluid module 200 is shown, this can be replaced with a compressor, a liquid pump, a multiphase pump, or a combination thereof that best suits the fluids and conditions of the well to maximize well performance. In addition, the use of passive magnetic radial bearing assemblies 222 and active magnetic thrust bearing assemblies 218 can be seen as one example of such an implementation of magnetic bearings, where active radial bearings and/or passive thrust bearings can be used instead of or in addition to, in any case to enhance the downhole system performance.

The passive magnetic radial bearing assemblies 222 include permanent magnets on the central shaft 216 and the outer housing 210. The magnets on the central shaft 216 are configured to repel the magnets on the outer casing 210 allowing the shaft to be levitated and supported by the magnets. The passive magnetic radial bearings do not include any electronic circuitry capable of actively altering the magnetic field to affect the supporting characteristics of the bearings. That is, an external power source is not needed to power the radial passive magnetic bearings. Both stator magnets and rotor magnets are canned or otherwise isolated to prevent process fluids from reaching the magnets and degrading performance. In some implementations, damping for the passive system, which can be either or both radial or axial, is provided by solid high electrically conductive plates or tubes, such as copper or aluminum.

In some implementations, an active damping circuit 232 can be included with the passive magnetic radial bearing assemblies 222. The active damping circuit 232 uses a coil to sense rotor radial motion and provide a current in size and frequency relative to this motion to a control board. The control board amplifies this signal and adjusts the relative polarity/phase to feed it back to a damping coil that reacts against the rotor field to resist the motion, thus damping out the motion. No radial position sensors or controller is required for the passive radial bearing operation. The active damping circuit 232 is able to adjust the magnetic field sufficiently enough to reduce vibration, but does not have the power to significantly affect the lifting or support characteristics of the bearing. In some implementations, the active damping circuit 232 acts as a generator that generates power when the axial gap decreases and thus powers a control coil to increase the levitating force. Thus, it doesn't need a sensor or an outside power source/controller. This approach can also be used for the axial axis, where a sense coil output sensing axial motion is amplified and fed to a damping to coil to react against the rotor field to resist motion. In some instances, the active damping circuit 232 can include the active damping circuit described in U.S. patent application Ser. No. 15/392,258.

The active magnetic thrust bearing assembly 218 and the passive magnetic radial bearing assembly 222 fully support the central shaft 216 with one or more electromagnetic fields. That is, the central shaft 216 is not physically coupled the outer housing 210 during normal operation; there is no physical connection between the central shaft 216 and the outer housing 210. In other words, the shaft is spaced apart from the outer housing 210 and any associated mechanism connected to the outer housing 210 with a radial gap between the central shaft 216 and the outer housing 210.

In the illustrated implementation, the electric machine 212 is positioned downhole of the fluid module 200. The illustrated implementation also shows the active thrust bearing assembly residing between the electric machine and the fluid module 200. In some instances, the fluid module 200, the thrust bearing module 214, and the electric machine 212 can be assembled in a different order. For example, the thrust bearing module 214 can be positioned downhole of the electric machine 212 or uphole of the fluid module 200.

In FIG. 2, the central shaft 216 comprises multiple sub-sections coupled together: a fluid rotor 216a, a thrust bearing rotor 216b, and an electric rotor 216c. Each sub-section is joined together by a coupling 224. The coupling 224 can be a bellows, quill, diaphragm, or other coupling type that provides axial stiffness and radial compliance. A bellows-style coupling includes a spring positioned between two shafts. The spring has a high radial torsional stiffness allowing for torque transmission, but a low lateral stiffness and a low lateral moment stiffness that allows for rotodynamic "play" between the shafts during operation. A bellows-style coupling can be attached to each shaft in a variety of ways, such as with a clamping hub located on either end of the bellows-style coupling. A quill-style coupling includes a shaft with a significantly greater length to diameter ratio than either shaft that is being coupled. The thinner cross-section allows for a high radial torsional stiffness and a high axial stiffness. The thinner cross-section also allows for a low lateral moment stiffness that allows for rotodynamic "play" between the shafts during operation. Specific dimensions and stiffness's are specific for each application. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. In some implementations, the central shaft 216 can include a single, unitary shaft that runs through the fluid module 200, the thrust bearing module 214, and the electric machine 212.

The use of magnetic bearings allows for a seal-less design. That is, the surface of the fluid rotor 216a, the thrust bearing rotor 216b, and the electric rotor 216c need not be sealed from and can all be exposed to the production fluid. As no mechanical bearings are used in the downhole-type artificial lift system 124, no lubrication is needed. As there is no lubrication or mechanical parts that have contamination concerns, no seals are needed for such components. Sensitive electronic and magnetic components can be "canned" or otherwise isolated from the downhole environment without affecting their electromagnetic characteristics. Details on "canning" are discussed later within this disclosure. There is a common fluid path through the passive magnetic radial bearing assemblies 222 and the active magnetic thrust bearing assemblies 218 that allow fluid to flow through an "air-gap" 226 in each of the bearings. More specifically, the active magnetic thrust bearing assemblies 218 have thrust bearing gaps 228 between a bearing housing 230 and the central shaft 216. The gap is unsealed and is of sufficient size to allow fluid flow through the active magnetic thrust bearing assembly 218. The passive magnetic radial bearing assemblies 222 include one or more radial bearing gaps 226 between a bearing housing 230 and the central shaft 216. The radial bearing gaps 226 and the thrust bearing gaps 228 are sufficiently large to allow particulates to pass through without causing damage to rotating or stationary components. For example, in the illustrated implementation, an air-gap between the central shaft 216 (e.g., electric rotor 216c) and a stator of the electric machine 212 receives the fluid during operation of the downhole-type artificial lift system 124 downhole-type artificial lift system 124. That is, an air-gap between the electric rotor 216c and the electric stator of the electric machine receives the fluid during operation of the electric machine. The bearings do not require seals as there is no physical contact between the central shaft 216 and the outer case 210. In other words, the central shaft 216 is spaced apart from the outer housing 210 and is not mechanically connected to the outer housing 210.

Figure 3:
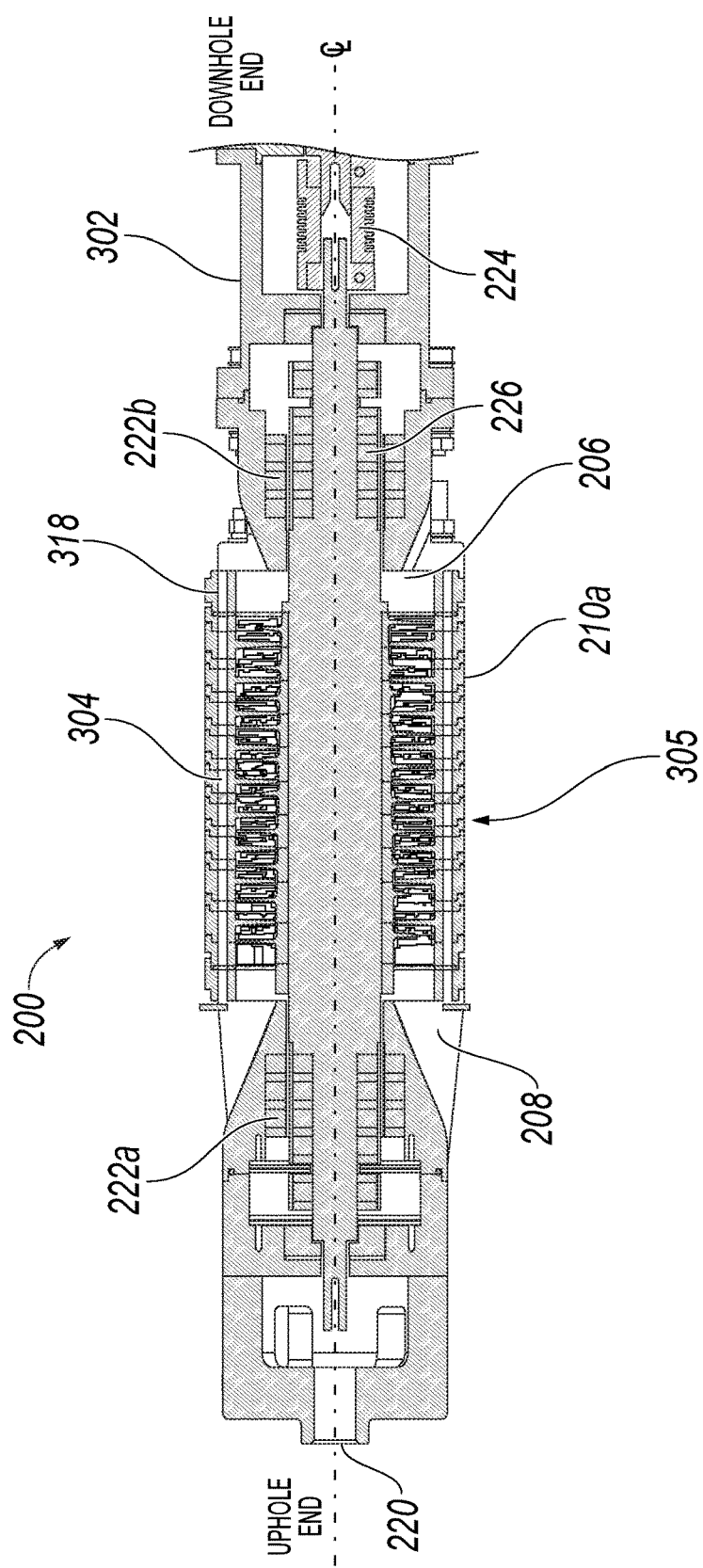
FIG. 3 is a schematic side half cross-sectional view of an example fluid module.

FIG. 3 is a detailed, half cross-sectional view of the fluid module 200. The fluid module 200 can be configured to move liquid and act as a pump, or any combination of liquid and gas. During operation, production fluid flows through the fluid module 200 in an uphole direction. In the illustrated implementation, the fluid module 200 is coupled to an uphole end of the thrust bearing module 214 by the coupling 224 and a coupling housing 302. The fluid rotor 216a is axially supported and levitated by the thrust bearing module (not shown). In the illustrated implementation, a first passive magnetic radial bearing 222a supports a first end of the fluid rotor 216a relative to a concentrically surrounding fluid stator 210a. The first passive magnetic radial bearing 222a radially levitates and supports a first end of the fluid rotor 216a. In some implementations, a second passive magnetic radial bearing 222b is used to support a second end of the fluid rotor 216a relative to the surrounding fluid stator 210a. The second passive magnetic radial bearing 222b radially levitates and supports a second end of the fluid rotor 216a.

In some implementations, such as the implementation shown in FIG. 3, the fluid module 200 includes a fluid rotor 216a and a fluid stator 210a. The fluid rotor 216a, as illustrated, is an axial fan with blades radiating out from a central axis. The blades are configured to drive or be driven by a production fluid in the wellbore. The fluid stator 210a includes stator vanes radiating in towards a center axis. The stator vanes are configured to direct fluid flow to increase the efficiency off the fluid module 200. The rotor vanes and the stator vanes interface without contacting one another while the fluid rotor 216a is rotating. The inner surface of the fluid stator 210a and the outer surface of the fluid rotor 216a define an annulus. Production fluid flows through this annulus. As illustrated, the fluid module 200 includes a segmented fluid stator 210a that includes multiple axially stacked, assembled together segments 304, stacked against one another. The stacked-stator implementation has several benefits, particularly during assembly. Assembling stacked stator segments 304 one piece at a time significantly reduces weight during each assembly step. Such a process allows the rotor to be completed independent of the stator, where the stator stages are then built around the rotor for a simplified and lower cost build process. Any adjustment for alignment can be determined as the stages are stacked via shims to ensure the unit is aligned with rotor to stator blade clearances for optimal performance.

In FIG. 3, each stator segment 304 is configured to stack against one another with a stator segment lip 816 that centers each stator segment 304 once stacked. The stator segments 304 are held together by one or more stator bolts 305. Each stator segment has one or more bolt holes 318 near the outer edge of the stator segment that allows the stator bolt 305 to pass though the stator segment 304. In FIG. 3, the stacked stator segments 304 can define the outer housing 210 of the fluid module 200.

In some implementations, the fluid rotor 216a can also include multiple rotor segments that are designed to stack against one another. In some implementations, the fluid rotor 216a can include a central portion that is configured to retain blades. In some implementations, torque can be transferred to or from the fluid rotor 216a through the coupling 224. The coupling 224 can be a bellows, quill, diaphragm, or other coupling type that provides axial stiffness and radial compliance. A bellows-style coupling includes a spring positioned between two shafts. The spring has a high radial torsional stiffness allowing for torque transmission, but a low lateral stiffness and a low lateral moment stiffness that allows for rotodynamic "play" between the shafts during operation. A bellows-style coupling can be attached to each shaft in a variety of ways, such as with a clamping hub located on either end of the bellows-style coupling. A quill-style coupling includes a shaft with a significantly greater length to diameter ratio than either shaft that is being coupled. The thinner cross-section allows for a high radial torsional stiffness and a high axial stiffness. The thinner cross-section also allows for a low lateral moment stiffness that allows for rotodynamic "play" between the shafts during operation. Specific dimensions and stiffness's are specific for each application. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. The coupling 224 transmits torque and axial forces and movement from one shaft to the other while allowing for radial misalignment between the shafts. Such axial movement may be experienced due to thermal growth during operation. As illustrated, the coupling 224 connects the downhole end of the fluid rotor 216a to an uphole end of the thrust bearing module 214.

Figure 4A:
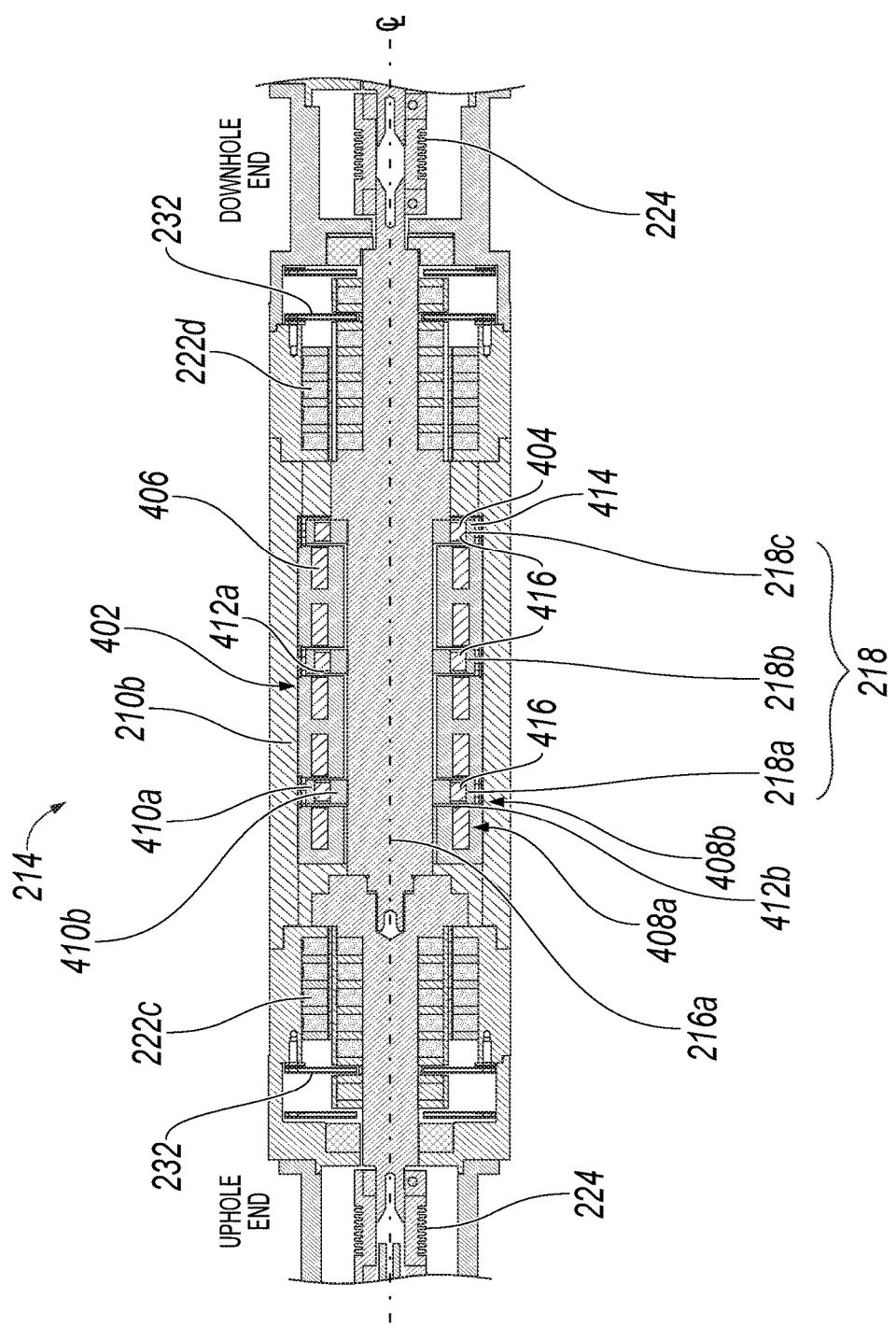
FIG. 4A is a schematic side half cross-sectional view of an example thrust bearing module.

FIG. 4A is a side half cross-sectional view of an example thrust bearing module 214. The thrust bearing module 214 includes one or more active magnetic thrust bearing assemblies 218 that support a central shaft 216 (thrust bearing rotor 216b) to a surrounding bearing stator 210b. The active magnetic thrust bearing assembly 218 is configured to levitate and support a central shaft 216 axially within an outer housing 210 (surrounding stator 210b). Passive radial bearings 222c and 222d are configured to levitate and support a central shaft 216 radially within an outer housing 210. An active damping circuit 232 is included and is configured to damp radial vibration within the central rotor. Axial vibrations are mitigated with the active magnetic thrust bearing assemblies 218, or with an additional axial damping circuit (not shown).

In some instances, position sensors are required for an active magnetic bearing, such as for the active magnetic thrust bearing assemblies 218, and can use conventional inductive, eddy current, or other types of sensors. These sensors must be isolated from the environment to ensure operation over the time downhole. With conventional sensors, electronics could be installed downhole in the device or at a topside facility with sensor downhole.

The position sensors can include a position sensitive generator, such as an axial gap generator, that can produce a voltage proportional to the axial gap that can be used to determine axial position. This offers a high voltage output that can be transmitted over long distances to minimize line drop and noise issues. Multiple approaches can be used to achieve a sensor downhole for the thrust bearing system, but all are unique in how they are integrated into the system to meet the operating environment.

The thrust bearing module 214 compensates for any axial loads and hold the axial position of the multiple module rotors by applying force to the rotor to maintain position. As loads are developed from the act of compressing or pumping fluids, the thrust bearing controller 150 senses position movement of the rotor from a target set point. The thrust bearing controller 150 then increases the current to the coil ("C" shaped core 406) that is converted to force on the rotor. This force is determined based on the amount of displacement sensed and the rate of change in motion using the specific control approach set by the thrust bearing controller 150. The active thrust bearing assembly 218 with thrust bearing controller 150 is thus able to compensate for forces on the rotor and apply corresponding off-setting forces to keep the rotor in an axial centered position. While a permanent magnet on the rotor configuration is shown, various configuration of thrust bearing could be applied, including all electric or alternative permanent magnet configurations.

As illustrated, the thrust bearing module 214 allows for non-magnetic spacers 414 to be used at the rotor outer diameter for setting stator axial position and for locking the split stator assemblies 402. Opposite polarity permanent magnets 404 are used on the thrust bearing rotor 216b to allow for coil wrapping of one or more back-to-back stator "C" shaped cores 406 to reduce overall bearing size and make assembly possible in split stator halves (i.e. both use the same coil). The outer housing, limited by the well installation casing size and flow path requirements, limits thrust bearing outer diameter, where the rotor outer diameter is further limited by the stator spacer and adequate clearance for rotor radial motion during operation and transport, and radial rotor growth due to high speed operation. In the illustrated implementation, the thrust bearing stator poles 408a are radially offset from the rotor inner poles 410b. With the restricted rotor outer diameter limiting the rotor pole size, the stator pole offset increases the cross section of the thrust bearing stator poles 408a, which increases the capacity of the active thrust bearing assembly 218, increasing bearing capacity without increasing overall bearing size.

Figure 4B:
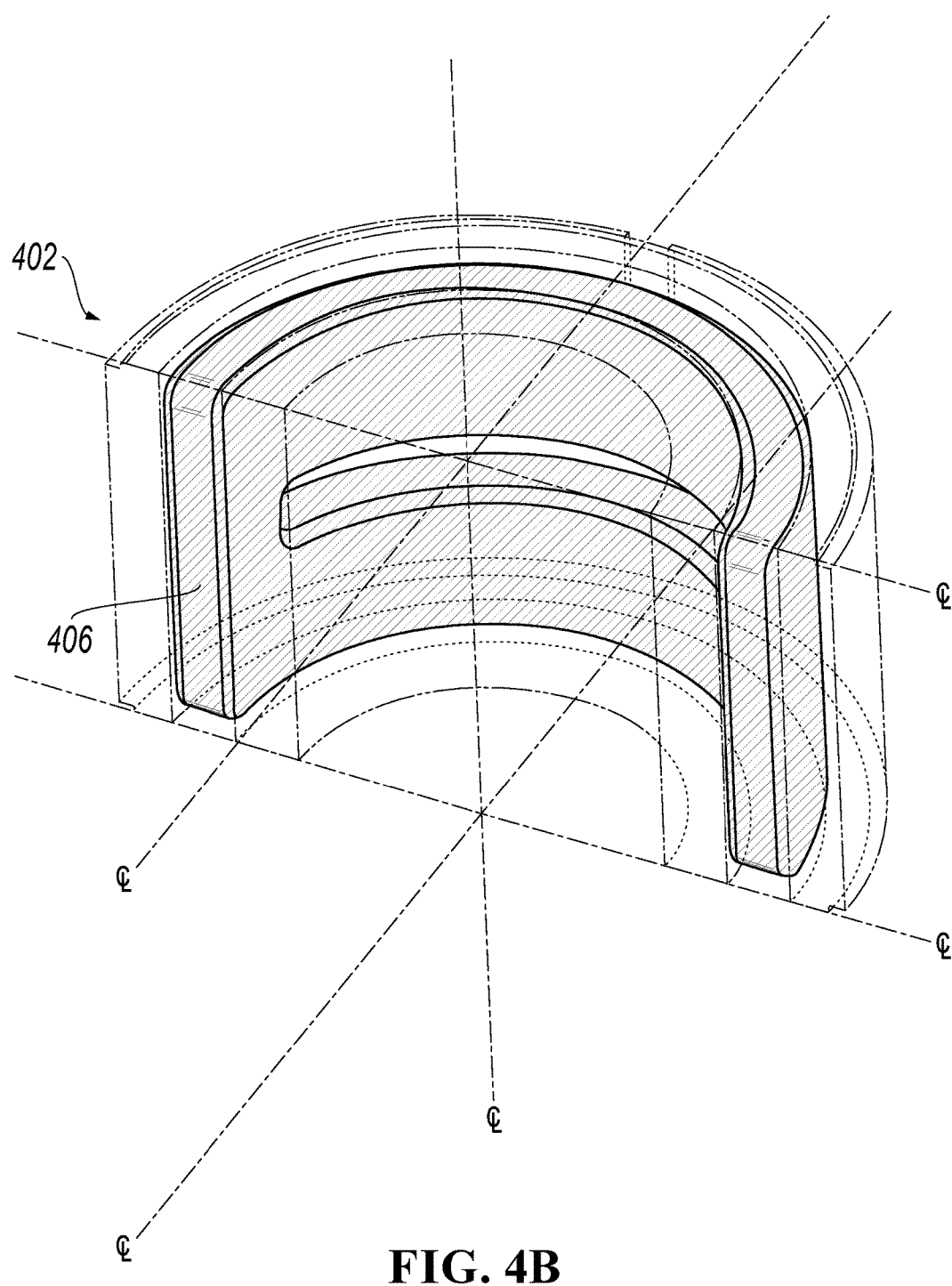
FIG. 4B is a perspective half cross-sectional view of an example half stator pole.

Illustrated in FIG. 4B is an example "C" shaped core 406 which include the stator coils in the stator assemblies 402. The stator assembly 402 is shown in phantom lines around the "C" shaped core 406. The polarity for these "C" shaped cores 406 as it applies to each opposite pole face is opposite of one another. Each back to back "C" shaped core 406 is split in half to form two 180 degree assemblies. The "C" shaped cores 406 in each of these 180 degree assemblies are wrapped from one side to the other, and results in opposite coil polarity on each side of the "C" shaped core 406. This in conjunction with the permanent magnets 404 on the thrust bearing rotor 216b having opposite polarity works to minimize size and simplify integration (coils that are split do not need to be routed to the outer diameter where they take up additional room and do not aid in generating bearing force). A third passive magnetic radial bearing 222c supports and levitates the thrust bearing rotor 216b to the bearing stator 210b. A fourth passive magnetic radial bearing 222d supports and levitates the thrust bearing rotor 216b to the bearing stator 210b.

The illustrated implementation (FIG. 4A) shows a three bearing module with a first thrust bearing 218a, a second thrust bearing 218b, and a third thrust bearing 218c. The stator pole on the third thrust bearing 218c is missing in the arrangement shown, where this is to be the downhole side of the module. Since the thrust load is always in a downhole direction as the system pushes fluid uphole, this arrangement of leaving the bottom stator pole provides a passive force in the uphole direction. That is, with no current, the module will lift the thrust bearing rotor 216b (and anything coupled to the thrust bearing rotor 216b) in an uphole direction. Further lift can be imparted on the rotor with coil current in one direction, and lift can be reduced with coil current in the opposite direction. The number of thrust bearings in a module can be one or more, depending on size, integration, rotodynamics, and other design considerations.

The thrust bearing module 214 includes a rotor outer pole 410a. The rotor outer pole 410a is a magnetic steel pole that is magnetically acted upon by the thrust bearing stator pole 408a to produce force on the thrust bearing rotor 216b. The rotor outer pole 410a acts to conduct a permanent magnet field and a coil generated magnetic field and acts as the primary containment of the permanent magnet ring 416 onto the rotor for high speed operation. In some implementations the rotor outer pole 410a is secured with an interference fit on an inner diameter of the rotor outer pole 410a to the permanent magnet ring 416.

A rotor inner pole 410b is a magnetic steel pole that is magnetically acted upon by the thrust bearing stator pole 408a to produce force on the thrust bearing rotor 216b. The rotor inner pole 410b acts to conduct the permanent magnet field and the coil generated magnetic field. The rotor inner pole 410b is the primary connection point to the central shaft 216 (thrust bearing rotor 216b) with which the thrust bearing forces are applied to the central shaft 216.

A radially magnetized permanent magnet ring 416 is a permanent magnet material that provides magnetic field that the active magnetic thrust bearing 218 uses to distribute to thrust bearing stator poles 408a on each side of the thrust bearing rotor 216b, thus energizing each gap between rotor pole and stator pole. The permanent magnet field provides roughly half of the maximum field designed for the thrust bearing stator poles 408a and rotor poles 408b, where this level allows for linear current load response from the bearing. The permanent magnet ring 404 is radially magnetized to provide a uniform polarity field to the outer poles and inner poles. With the use of multiple thrust bearing assemblies 218, the polarity of these rotor permanent magnets 404 changes from one to the next to allow for opposite coil polarity in double stator poles.

A rotor seal can 412a is a ring that covers the permanent magnet 404 sides and is welded or otherwise sealed to the metal outer and inner poles to prevent process fluids from contacting the permanent magnet and degrading performance. The cans 412a can be metallic, and nonmagnetic, but could also be made of a non-metallic material, such as Peek or ceramic.

A thrust bearing stator pole 408a is a stator pole that includes a magnetic steel material that conducts the permanent magnet flux and electromagnet coil flux for energizing the pole air gaps that result in forces on the thrust bearing rotor 216b. The thrust bearing stator poles 408a are secured to the housing to transmit forces relative to the outer housing 210.

A thrust bearing coil 406 is an electromagnet coil that is a wound coil with electronical insulation to take currents from the magnetic bearing controller and convert these to magnetic field in the thrust bearing 218. In some implementations, the thrust bearing coil 406 can be made of copper.

A thrust bearing stator seal can 412b is a ring that covers the electromagnet coil 406 sides and is welded or otherwise sealed to the metal outer and inner poles to prevent process fluids from contacting the electromagnet coil and affecting performance. The cans 412b can be metallic, and nonmagnetic, but could also be made of a non-metallic material, such as Peek or ceramic.

A stator pole spacer 414 is a spacer that includes nonmagnetic steel pieces and is used to set the relative position of two stators or a stator and housing to locate the stator poles in relation to the outer housing 210.

A double stator pole is split in two halves for assembly (a single half is shown in detail in FIG. 4B). These stator poles include two halves that use two coils. The coils wrap 180 degrees on one side and then are routed to the other side where they wrap 180 degrees back and route back to where they started to form a complete loop. This coil winding, along with polarizing the rotor magnets opposite for each subsequent rotor, allows for utilizing the complete coil loop for a split stator pole. As such, the two poles are combined for minimum space necessary.

Figure 5:
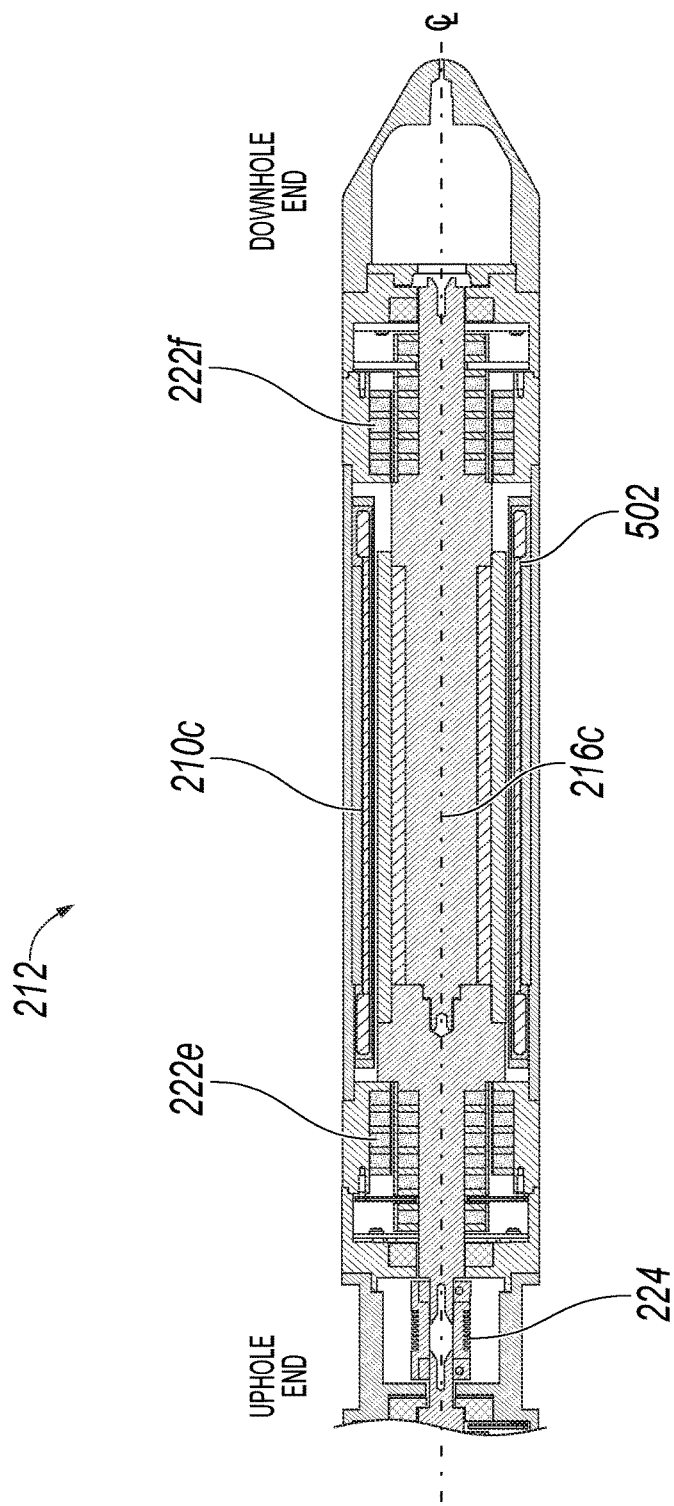
FIG. 5 is a schematic side half cross-sectional view of an example electric machine module.

FIG. 5 is a side half cross-sectional schematic diagram of the electric machine 212 that can be used with aspects of this disclosure. In the illustrated implementations, the electric machine 212 is coupled to a downhole end of the thrust bearing module 214 (not shown). The electric machine 212 is configured to either drive or be driven by the fluid rotor 216a (not shown) to generate electricity. The electric machine 212 includes a electric rotor 216c that is axially levitated and supported by the thrust bearing module 214. The electric rotor 216c can include a permanent magnet rotor, an inductive rotor, or any other type of electric rotor. The electric rotor 216c is coupled to the thrust bearing rotor 216b by a coupling 224. The coupling 224 can be a bellows, quill, diaphragm, or other coupling type that provides axial stiffness and radial compliance. A bellows-style coupling includes a spring positioned between two shafts. The spring has a high radial torsional stiffness allowing for torque transmission, but a low lateral stiffness and a low lateral moment stiffness that allows for rotodynamic "play" between the shafts during operation. A bellows-style coupling can be attached to each shaft in a variety of ways, such as with a clamping hub located on either end of the bellows-style coupling. A quill-style coupling includes a shaft with a significantly greater length to diameter ratio than either shaft that is being coupled. The thinner cross-section allows for a high radial torsional stiffness and a high axial stiffness. The thinner cross-section also allows for a low lateral moment stiffness that allows for rotodynamic "play" between the shafts during operation. Specific dimensions and stiffness's are specific for each application. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. An electric stator 210c surrounds the permanent magnetic rotor 216c. The electric stator includes electric coils 502. A fifth passive magnetic radial bearing 222e supports and levitates the electric rotor 216c to the electric stator 210c. A sixth passive magnetic radial bearing 222f supports and levitates the electric rotor 216c to the electric stator 210c. As the permanent magnet rotor is axially supported by the thrust bearing module 214, no thrust bearing is needed within the electric machine 212. The electric stator 210c is canned using a metallic or non-metallic sleeve on the inner diameter of the electric stator 210c. The can is sealed, by welding for example, at each end and supported from any well pressure by the stator and/or potting behind the sleeve to insure it does not deform during operation. Multiple electric machines 212 can be connected in series to produce more power if needed.

The electric machine 212 is controlled by a high frequency variable speed drive (VSD) from the surface. Variable frequency or speed allows the electric machine 212 drive to rotating the device at a speed optimal for well production. It also allows for one drive to be used at many well sites where performance in speed and power vary. While sensored drives could be used, bringing sensor signals to the surface over long distances presents many challenges, including cables and connectors in addition to having the actual sensor and their associated electronics installed in the system. The downhole-type artificial lift system 124 uses a sensor-less VSD capable of long distance (>300 meters) electric machine 212 control. This sensor-less VSD monitors the speed of the electric machine 212 and is able to maintain speed or torque control of the electric machine 212 to ensure it operates as desired. The VSD is also capable of interpreting the machine parameters to provide operating data on motor temperature and fluid properties, such as density, for example.

Cables connect the topside VSD to the downhole electric machine 212, transmitting the low voltage (<600 vac) or medium voltage (<10,000 VAC) from the VSD to the electric machine 212. For longer distances, higher voltage is desired to reduce current losses in the cable and reduce cable size. Reductions in cable size reduce cable cost and cable weight, though require higher class of electrical insulation on the cable.

The components described previously within this disclosure can be used to implement the following example method. A shaft is centrally positioned within a stator comprising a fluid module and an electric machine with a passive radial magnetic bearing assemblies coupled to the shaft and the stator. The shaft is axially supported with an active magnetic thrust bearing assembly coupling the shaft and the stator. The shaft is rotated within the stator positioned within a wellbore.

Figure 6:
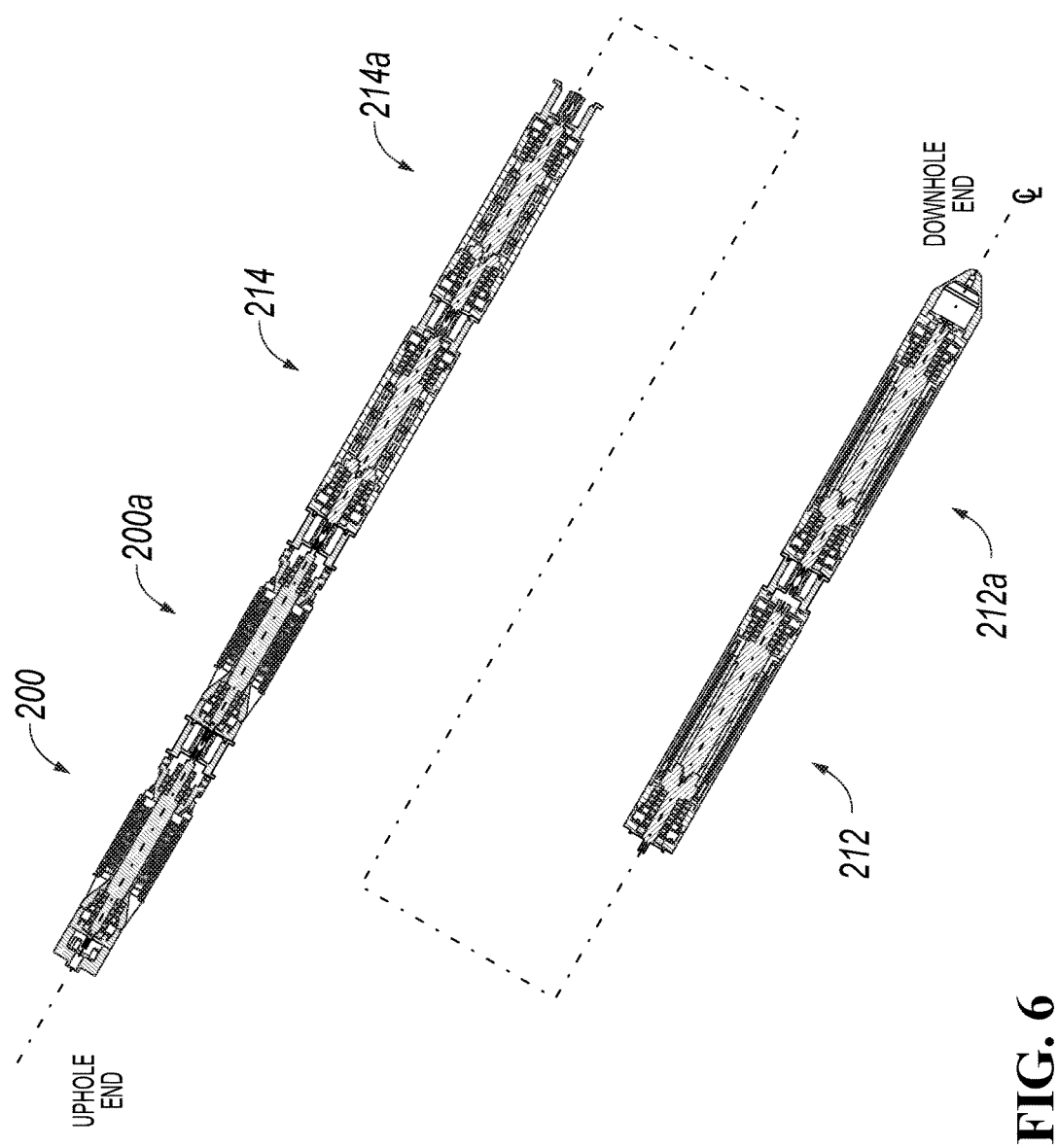
FIG. 6 is a schematic side half cross-sectional view of an example artificial lift system.

While some examples of the subject matter have been disclosed, aspects of this disclosure can describe other implementations. For example, in some implementations, the central shaft rotates at a sub-critical speed below a first harmonic of the central shaft. While the illustrated examples included two radial bearings within each module, a single radial bearing at an uphole end of the fluid module and at a downhole end of the downhole-type electric machine module (two total radial bearings) to provide adequate levitation and support. Active and/or passive damping systems can be used on the passive magnetic radial bearings, the active magnetic thrust bearings, or both. In instances where a passive damping system is used, a highly electrically conductive metal plate, such as a copper plate, can be used. In such an instance, the movement of the rotor generates eddy currents on a copper plate. The eddy currents in turn generate a magnetic field that opposed the field in the rotor, resulting in a force applied to the rotor opposite that of the motion, reducing the motion. The faster and larger the motion, the larger the force generated on the plate in response to the motion. While a permanent magnet rotor was described in the context of the electric machine, an inductive rotor can be used to similar effect. While the illustrated implementations described include a single fluid module, a single thrust bearing module, or a single electric machine module, additional modules can be added without departing from this disclosure. Such an example is illustrated in FIG. 6. For example, an additional fluid module 200a can be added to increase a production fluid flow rate and/or pressure at the wellhead. In some implementations, an additional thrust module 214a can be added in situations where a larger thrust load is expected. In some implementations, an additional electric machine 212a can be added, for example, when more torque and/or power is required. Additional modules are rotodynamically isolated from the other modules.

The techniques described here can be implemented to yield a construction that is simple, inexpensive, and physically robust. The system can be deployed without special hydraulic or electrical requirements and can be easily retrievable with minimum or no risk of being stuck in the wellbore. The concepts described herein could also be applied to a blower, a compressor, having a higher pressure ratio and lower throughput, a pump, or a multiphase system where the fluid is a combination of liquid and gas. While this disclosure has been described in the context of production applications, it can also be used in injection applications. For example, the described systems can be used to inject fluid into a reservoir to maintain a production pressure on the reservoir.

A number of implementations have been described. Nevertheless, it will be understood that various modifications may be made. Accordingly, other implementations are within the scope of the following claims.

What is claimed is:

1. A downhole-type artificial lift system comprising:
   a fluid module comprising:
      a fluid rotor configured to rotatably drive or be driven by fluid produced from a wellbore;
      a first shaft coupled to the fluid rotor, the first shaft configured to rotate in unison with the fluid rotor; and
      a fluid stator that surrounds the fluid rotor;
   a thrust bearing module comprising:
      a thrust bearing rotor;
      a second shaft coupled to the thrust bearing rotor, the second shaft configured to rotate in unison with the thrust bearing rotor, the second shaft coupled to the first shaft, the second shaft configured to transfer torque between the first shaft and the second shaft, the second shaft being rotodynamically isolated from the first shaft; and a thrust bearing stator that surrounds the thrust bearing rotor; and an electric machine module comprising:
an electric machine rotor;
a third shaft coupled to the electric machine rotor, the third shaft configured to rotate in unison with the electric machine rotor, the third shaft coupled to the second shaft or the first shaft, the third shaft configured to transfer torque between the second shaft and the third shaft or between the second shaft and the first shaft, the third shaft being rotodynamically isolated from the first shaft and the second shaft; and
an electric stator that surrounds the electric machine rotors;

wherein the system is configured to rotate the first shaft below a critical speed of the first shaft, rotate the second shaft below a critical speed of the second shaft, and rotate the third shaft below a critical speed of the third shaft.

2. The downhole-type artificial lift system of claim 1, wherein the critical speed of the first shaft, the critical speed of the second shaft, and the critical speed of the third shaft are greater than a critical speed of a single shaft of equivalent length to a sum of a length of the first shaft, a length of the second shaft, and a length of the third shaft.

3. The downhole-type artificial lift system of claim 1, wherein the system is configured to rotate the first shaft, the second shaft, and the third shaft at 10,000 revolutions per minute.

4. The downhole-type artificial lift system of claim 1, wherein the system is configured to rotate the first shaft, the second shaft, and the third shaft at 120,000 revolutions per minute.

5. The downhole-type artificial lift system of claim 1, wherein the fluid module is positioned at an uphole end of the system and the electric machine module is positioned at a downhole end of the system.

6. The downhole-type artificial lift system of claim 1, wherein the fluid module further comprises:
a first magnetic radial bearing configured to support a first end of the first shaft to the fluid stator; and
a second radial magnetic bearing configured to support a second end of the first shaft to the fluid stator.

7. The downhole-type artificial lift system of claim 1, wherein the electric machine module further comprises:
a first magnetic radial bearing configured to support a first end of the second shaft to the electric stator; and
a second radial magnetic bearing configured to support a second end of the second shaft to the electric stator.

8. The downhole-type artificial lift system of claim 1, wherein the thrust bearing module comprises a magnetic thrust bearing.

9. The downhole-type artificial lift system of claim 8, wherein the magnetic thrust bearing is an active magnetic thrust bearing.

10. The downhole-type artificial lift system of claim 1, wherein the thrust bearing module further comprises:
a first magnetic radial bearing configured to support a first end of the second shaft to the thrust bearing stator; and
a second radial magnetic bearing configured to support a second end of the second shaft to the thrust bearing stator.

11. The downhole-type artificial lift system of claim 1, wherein the fluid module is a first fluid module, the fluid rotor is a first fluid rotor, and the fluid stator is a first fluid stator, the downhole-type artificial lift system further comprising a second fluid module comprising:
a second fluid rotor configured to rotatably drive or be driven by fluid produced from a wellbore;
a fourth shaft coupled to the second fluid rotor, the fourth shaft configured to rotate in unison with the second fluid rotor, the fourth shaft being rotodynamically isolated from the first shaft, the second shaft, and the third shaft; and
a second fluid stator that surrounds the second fluid rotor.

12. The downhole-type artificial lift system of claim 1, wherein the thrust bearing module is a first thrust bearing module, the thrust bearing rotor is a first thrust bearing rotor, and the thrust bearing stator is a first thrust bearing stator, the downhole-type artificial lift system further comprising a second thrust bearing module comprising:
a second thrust bearing rotor;
a fourth shaft coupled to the thrust bearing rotor, the fourth shaft configured to rotate in unison with the second thrust bearing rotor, the fourth shaft being rotodynamically isolated from the first shaft, the second shaft, and the third shaft; and
a second thrust bearing stator that surrounds the second thrust bearing rotor.

13. The downhole-type artificial lift system of claim 1, wherein the electric machine module is a first electric machine module, the electric machine rotor is a first electric machine rotor, and the electric stator is a first electric stator, the downhole-type artificial lift system further comprising a second electric machine module comprising:
a second electric machine rotor;
a fourth shaft coupled to the second electric machine rotor, the fourth shaft configured to rotate in unison with the second electric machine rotor, the fourth shaft being rotodynamically isolated from the first shaft, the second shaft, and the third shaft; and
a second electric stator that surrounds the second electric machine rotor.

14. A method comprising:
radially magnetically levitating a first rotor within a first stator;
radially magnetically levitating a second rotor within a second stator;
radially magnetically levitating a third rotor within a third stator;
rotodynamically isolating the first rotor from the second rotor by a first rotodynamic isolator coupling; and
rotodynamically isolating the second rotor from the third rotor by a second rotodynamic isolator;
rotating the first shaft below a critical speed of the first rotor;
rotating the second shaft below a critical speed of the second rotor; and
rotating the third shaft below a critical speed of the third rotor.

15. The method of claim 14, further comprising rotating the first rotor, the second rotor, and the third rotor in unison at 10,000 revolutions per minute.

16. The method of claim 14, further comprising rotating the first rotor, the second rotor, and the third rotor in unison at 120,000 revolutions per minute.

17. The method of claim 14, further comprising axially supporting the first rotor, the second rotor, and the third rotor with a magnetic thrust bearing.

18. The method of claim 14, further comprising damping radial vibrations.

19. The method of claim 14, further comprising:
exchanging torque between the first rotor and second rotor by a first rotodynamic isolator coupling, the first coupling configured to rotodynamically isolate the first rotor and second rotor from one another; and
exchanging torque between the second rotor and the third rotor by a second rotodynamic isolator coupling, the second coupling configured to rotodynamically isolate the third rotor and second rotor from one another.

20. The method of claim 14, wherein an outer surface of the first rotor and an inner surface of the first stator form an annulus, the method further comprising flowing a wellbore production fluid through the annulus in an uphole direction.

21. A wellbore production system comprising:
a fluid module comprising:
 a fluid rotor configured to rotatably drive or be driven by fluid produced from a wellbore;
 a first shaft coupled to the fluid rotor, the first shaft configured to rotate in unison with the fluid rotor;
 a fluid stator that surrounds the fluid rotor;
 a first magnetic radial bearing configured to support a first end of the first shaft to the fluid stator; and
 a second radial magnetic bearing configured to support a second end of the first shaft to the fluid stator;
a thrust bearing module comprising:
 a thrust bearing rotor;
 a second shaft coupled to the thrust bearing rotor, the second shaft configured to rotate in unison with the thrust bearing rotor, the second shaft coupled to the first shaft, the second shaft configured to transfer torque between the first shaft and the second shaft, the second shaft being rotodynamically isolated from the first shaft; and
 a thrust bearing stator that surrounds the thrust bearing rotor; and
an electric machine module comprising:
 an electric machine rotor;
 a third shaft coupled to the electric machine rotor, the third shaft configured to rotate in unison with the electric machine rotor, the third shaft coupled to the second shaft or the first shaft, the third shaft configured to transfer torque between the second shaft and the third shaft or the first shaft, the third shaft being rotodynamically isolated from the first shaft and the second shaft;
 an electric stator that surrounds the electric machine rotor;
 a third magnetic radial bearing configured to support a first end of the second shaft to the electric stator; and
 a fourth radial magnetic bearing configured to support a second end of the second shaft to the electric stator;
wherein the system is configured to rotate the first shaft below a critical speed of the first shaft, rotate the second shaft below a critical speed of the second shaft, and rotate the third shaft below a critical speed of the third shaft.

22. The wellbore production system of claim 21, wherein the system is configured to rotate the first shaft, the second shaft, and the third shaft at 60,000 revolutions per minute.

23. The wellbore production system of claim 21, wherein the thrust bearing module further comprises:
a first magnetic radial bearing configured to support a first end of the second shaft to the thrust bearing stator; and
a second radial magnetic bearing configured to support a second end of the second shaft to the thrust bearing stator.

24. The downhole-type artificial lift system of claim 21, wherein the thrust bearing module comprises a magnetic thrust bearing.

25. The wellbore production system of claim 21, wherein the fluid module is a first fluid module, the fluid rotor is a first fluid rotor, and the fluid stator is a first fluid stator, the wellbore production system further comprising a second fluid module comprising:
a second fluid rotor configured to rotatably drive or be driven by fluid produced from a wellbore;
a fourth shaft coupled to the second fluid rotor, the fourth shaft configured to rotate in unison with the second fluid rotor, the fourth shaft being rotodynamically isolated from the first shaft, the second shaft, and the third shaft; and
a second fluid stator that surrounds the second fluid rotor.

26. The wellbore production system of claim 21, wherein the thrust bearing module is a first thrust bearing module, the thrust bearing rotor is a first thrust bearing rotor, and the thrust bearing stator is a first thrust bearing stator, the wellbore production system further comprising a second thrust bearing module comprising:
a second thrust bearing rotor;
a fourth shaft coupled to the thrust bearing rotor, the fourth shaft configured to rotate in unison with the second thrust bearing rotor, the fourth shaft being rotodynamically isolated from the first shaft, the second shaft, and the third shaft; and
a second thrust bearing stator that surrounds the second thrust bearing rotor.

27. The wellbore production system of claim 21, wherein the electric machine module is a first electric machine module, the electric machine rotor is a first electric machine rotor, and the electric stator is a first electric stator, the wellbore production system further comprising a second electric machine module comprising:
a second electric machine rotor;
a fourth shaft coupled to the second electric machine rotor, the fourth shaft configured to rotate in unison with the second electric machine rotor, the fourth shaft being rotodynamically isolated from the first shaft, the second shaft, and the third shaft; and
a second electric stator that surrounds the second electric machine rotor.

* * * * *